United States Patent [19]

Caron

[11] Patent Number: 4,572,315

[45] Date of Patent: Feb. 25, 1986

[54] POWER HITCH

[75] Inventor: Ronald L. Caron, Auburn, Me.

[73] Assignee: Valley Engineering, Inc., Gray, Me.

[21] Appl. No.: 578,754

[22] Filed: Feb. 9, 1984

[51] Int. Cl.[4] .............................................. B62D 5/06
[52] U.S. Cl. ..................................... 180/134; 280/468
[58] Field of Search ......................... 280/468; 180/134

[56] References Cited

U.S. PATENT DOCUMENTS 3,672,460  6/1972  Takata ................................ 280/468
4,310,061  1/1982  Khanna et al. ..................... 180/134

Primary Examiner—Joseph F. Peters, Jr.
Assistant Examiner—Donn McGiehan
Attorney, Agent, or Firm—Maurice E. Gauthier

[57] ABSTRACT

A power hitch has first and second frame elements interconnected for movement relative to each other about a vertical pivot axis. The first frame element is adapted for connection to a vehicle in a manner placing the pivot axis is to the rear of the vehicle. The second frame element is adapted for detachable connection to an implement to be towed behind the vehicle. The second frame element has a central axis extending rearwardly from the pivot axis. Extensible actuators on opposite sides of the central axis are pivotally connected at opposite ends respectively to each frame element. A suitable control system is employed to extend either one of the actuators while simultaneously retracting the other actuator in order to forcibly pivot the second frame element and the implement connected thereto about the pivot axis.

9 Claims, 7 Drawing Figures

4,572,315

POWER HITCH

BACKGROUND OF THE INVENTION

1. Field of the Invention

This invention relates generally to the towing of implements behind vehicles, and is concerned in particular with a power hitch for forcibly pivoting such tool implements in order to control the tracking thereof behind the vehicles and also to assist in vehicle steering.

2. Description of the Prior Art

The present invention is particularly suited for, although not strictly limited in use to, the towing of implements used to groom ski slopes and trails, where the hilly terrain and slippery conditions make it difficult for operators to steer the towing vehicles and grooming implements.

In the past, towing arrangements of the type shown in U.S. Pat. No. 3,768,583 (Waterman) have been employed with success. Although such arrangements allow the operator to forcibly pivot the grooming implement to insure proper tracking and to assist in vehicle steering, they occupy a major portion of the rear vehicle deck or platform, thereby making it impossible to simultaneously utilize the deck for other purposes, such as for example the simultaneous transportation of other equipment, supplies or personnel.

Other prior art towing arrangements employ a rigid non pivotable connection between the implement, and the vehicle. This is particularly unsatisfactory, however, because the implements do not properly follow or "track" behind the vehicles, which in turn makes it extremely difficult to steer the vehicles and to control movement and application of the implement.

SUMMARY OF THE PRESENT INVENTION

The objectives of the present invention include the provision of a power hitch which is located at the back of the vehicle, thereby freeing the rear vehicle deck for other uses, and which is capable of forcibly pivoting the implement to provide proper tracking and also to assist in vehicle steering.

In a preferred embodiment of the invention to be described hereinafter in greater detail, first and second frame elements are interconnected for movement relative to each other about a vertical pivot axis. The first frame element is adapted for connection to the vehicle at a location at which the pivot axis is to the rear of the vehicle, with the rear vehicle deck being substantially unobstructed and thus available for other uses. The second frame element is adapted for connection to an implement, and it has a central axis extending rearwardly from the pivot axis. Extensible actuators on opposite sides of the central axis are pivotally connected at opposite ends respectively to each frame element. A suitable control system is employed to extend either one of the actuators while simultaneously retracting the other actuator in order to forcibly pivot the second frame element and the implement connected thereto about the pivot axis.

Preferably, the actuators are disposed angularly with respect to the central axis of the second frame element, with the distance between the pivotal connections of the actuators to the second frame element being greater than the distance between the pivotal connections of the actuators to the first frame element.

The actuators preferably comprise double-acting hydraulic piston-cylinder units, and the control system insures that when one unit is fully extended, the other is fully retracted.

These and other objectives, features and advantages of the present invention will be described hereinafter in greater detail in connection with the accompanying drawings, wherein:

DETAILED DESCRIPTION OF PREFERRED EMBODIMENT

Figure 1:
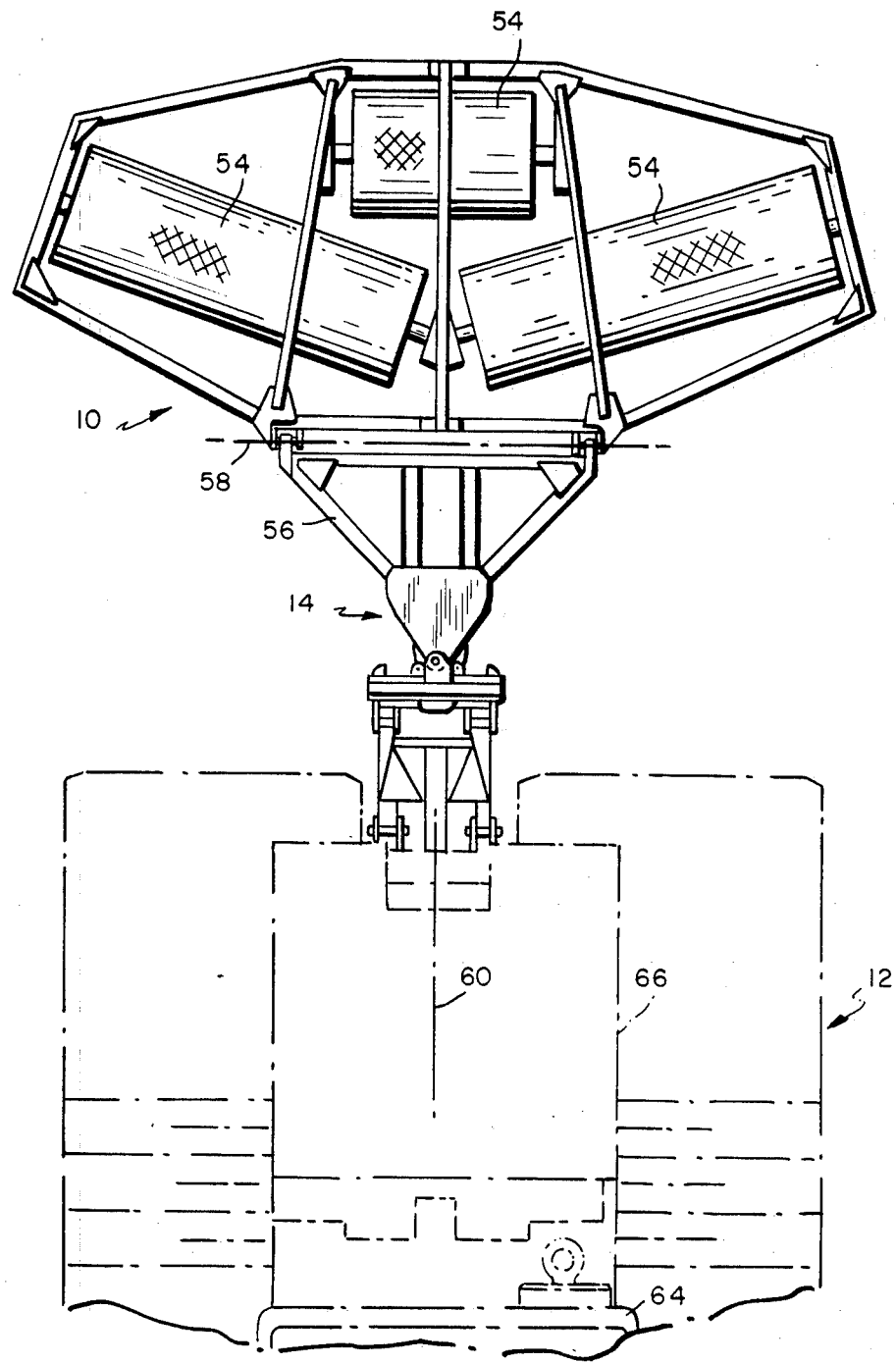
FIGS. 1 and 2 are plan and side elevational views respectively showing a conventional tool component used to groom ski slopes and the like connected to a tracked vehicle by means including a power hitch in accordance with the present invention.
Figure 2:
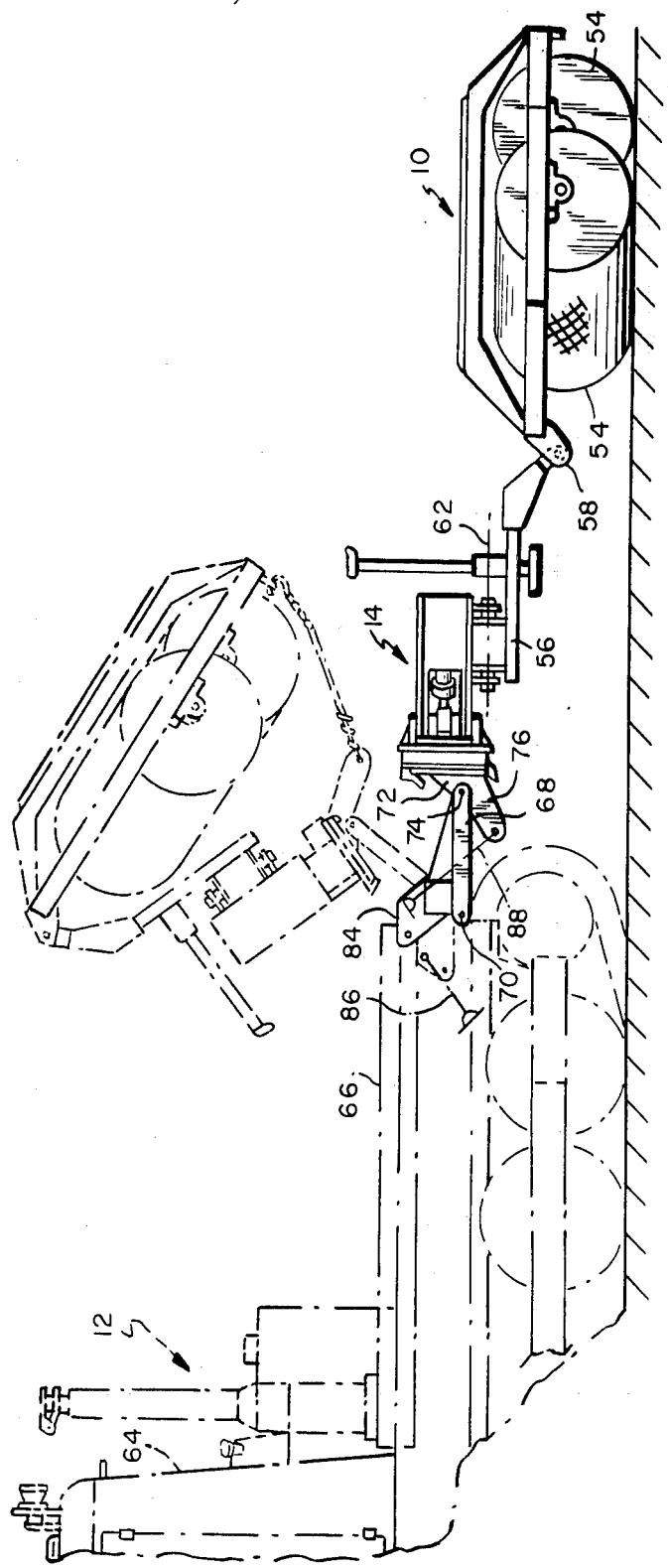

Referring initially to FIGS. 1 and 2, a conventional implement 10 for grooming ski slopes and the like is shown connected to a tracked vehicle 12 by means including a power hitch 14 in accordance with the present invention.

Figure 3:
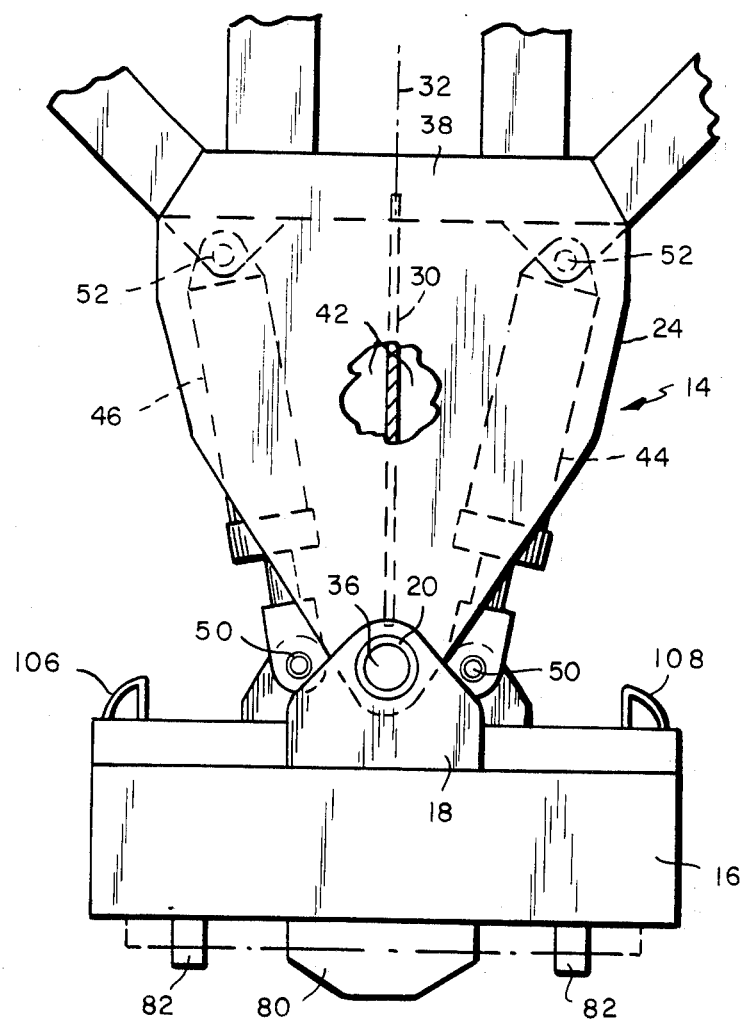
FIG. 3 is an enlarged plan view of the power hitch.
Figure 4:
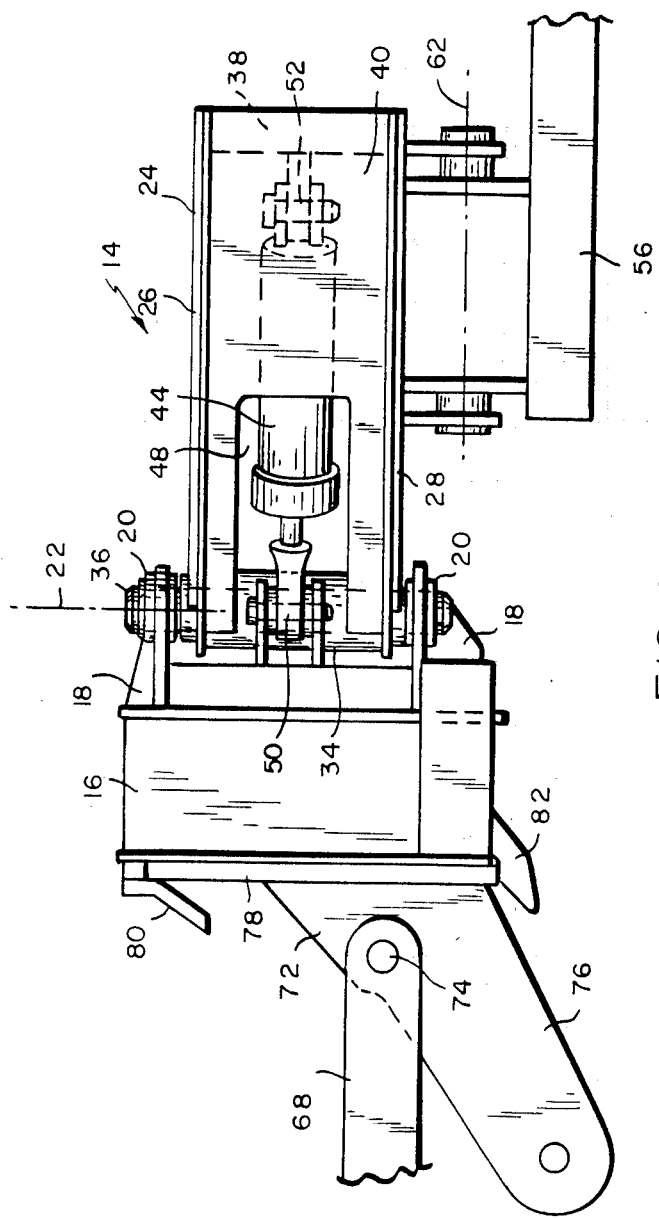
FIG. 4 is an enlarged side elevational view of the power hitch.

Referring additionally to FIGS. 3 and 4, it will be seen that the power hitch 14 includes a first frame element 16 having rearwardly extending vertically spaced brackets 18 which support bearings 20 defining a vertical pivot axis 22. A second frame element 24 has vertically spaced upper and lower plates 26, 28 interconnected by a longitudinal rib 30 lying on a central axis 32 of the second frame element. A sleeve 34 extends between the plates 26, 28. The sleeve is dimensioned to be received between and in alignment with the bearings 20. A pin 36 is inserted through the aligned sleeve 34 and bearings 20 to thereby connect the second frame element 24 to the first frame element 16 for pivotal movement about the pivot axis 22. A rear plate 38 and side plates 40 cooperate with the upper and lower plates 26, 28 and the central rib 30 to define compartments 42 located on opposite sides of the central axis 32. Extensible actuators, which preferably comprise double-acting hydraulic piston-cylinder units 44, 46 are located in the compartments 42. The piston-cylinder units extend through openings 48 in the side plates 40, and each unit is pivotally connected at its opposite ends respectively to the first frame element 16 at 50 and to the second frame element 24 at 52.

The distance between the pivotal connections 52 is greater than that existing between the pivotal connections 50. Consequently, the piston-cylinder units are rearwardly angled outwardly, each being angularly disposed with respect to the central axis 32. The pivotal connection 50 and the vertical pivot axis 22 lie in a common plane which is perpendicular to the central axis 32 when the actuators are identically adjusted to neutral positions as shown in FIG. 3. Moreover, the pivotal connections 52 lie in another common plane perpendicular to the central axis 32.

The implement 10 is of the type disclosed in U.S. Pat. No. 3,496,843 (Wallingford), having a plurality of foraminous rolls 54 which operate when drawn across a snow covered surface to convert compacted snow into a powdery layer suitable for skiing. The rolls 54 are supported by a frame which is connected to a draw bar 56 for pivotal movement about an axis 58 extending transversely with respect to the vehicle axis 60. The draw bar 56 is in turn pivotally connected to the underside of the lower plate 28 of the power hitch 14 for pivotal movement about an axis 62 perpendicular to axis 58.

Figure 5:
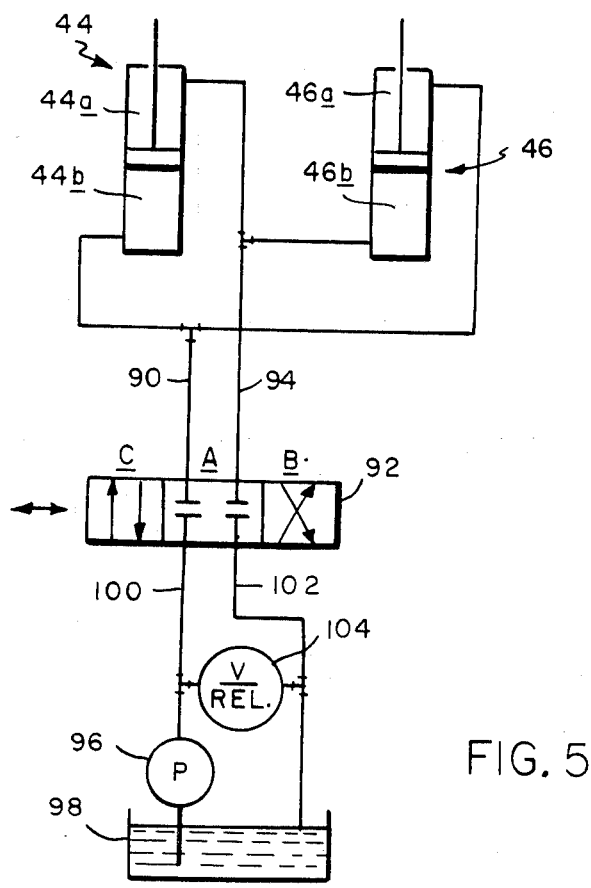
FIG. 5 is a schematic diagram of the hydraulic control system.

The vehicle 12 also may be of conventional track-driven design, having an operator's cab 64 at its forward end, and a rearwardly extending load platform or deck 66 which can be employed to transport equipment, supplies, personnel, etc. The power hitch 14 is connected to the rear of the vehicle by means of an adjustable assembly which, as can best be seen in FIGS. 2 and 4, includes a third frame element 68 pivotally connected at 70 to the rear end of the vehicle chassis, and a fourth frame element 72 pivotally connected at 74 to the third frame element 68. The fourth frame element 72 includes an angularly depending leg 76 and an upstanding mounting plate 78. The first frame element 16 has a hook 80 at its upper end and a pair of feet 82 at its lower end. The first frame element 16 is detachably secured to the fourth frame element 72 by locating the mounting plate 78 of the latter between the hook 80 and feet 82 of the former. The third frame element has an angularly upstanding plate 84. A double-acting hydraulic piston-cylinder unit schematically depicted at 86 is pivotally connected at its opposite ends to the vehicle chassis and to plate 84, and another similarly depicted piston-cylinder unit 88 is pivotally connected at its opposite ends respectively to the plate 84 and to the depending leg 76. The piston-cylinder units 86, 88 may be operated to raise the tool component 10 and power hitch 14 from their "use" positions as shown by the solid lines in FIG. 2, to the raised and folded "transport" positions shown by the broken lines in the same view, With reference to FIG. 5, it will be seen that the piston-cylinder units 44, 46 respectively have working chambers 44a, 44b and 46a, 46b. A trunk line 90 leads from a control valve 92 to working chambers 44b and 46a, and another trunk line 94 leads from the same control valve to working chambers 44a and 46b. A pump 96 draws hydraulic fluid from a reservoir 98 and is connected by means of a high pressure feed line 100 to valve 92. A return line 102 leads from the control valve back to the reservoir. A pressure relief valve 104 is connected between the feed and return lines 100, 102. The pump 96 and reservoir 98 may be located at any convenient place on the vehicle 12. The control valve 92 is located in the operator's cab 64, and is capable of being manually adjusted to one of three settings A, B or C.

At setting A, the trunk lines 90, 94 are disconnected from the feed and return lines 100, 102, thereby fixing the piston-cylinder units 44, 46 at their respective adjustments. At setting B, feed line 100 is connected to trunk line 94 and return line 102 is connected to trunk line 90, with the result that piston-cylinder unit 46 is extended while simultaneously retracting pistoncylinder unit 44. At setting C, piston-cylinder unit 44 is extended while retracting piston-cylinder unit 46.

It thus will be seen that by adjusting the control valve 92 to either settings B or C, the vehicle operator can pivotally manipulate the second frame element 24 and implement 10 in opposite directions about the pivot axis 22. The implement can be fixed at any desired position by adjusting the control valve to the A setting.

The first frame element 16 is preferably provided with stops 106, 108 which are engaged by the second frame element 24 when it reaches either extreme of its pivotal motion about pivot axis 22.

Figure 6A:
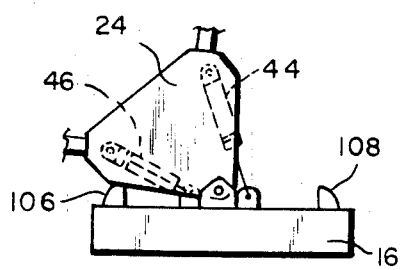
FIGS. 6A and 6B are schematic illustrations showing the maximum extent to which the hitch can be pivotally adjusted in either direction.
Figure 6B:
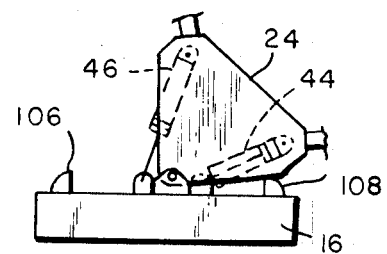

As schematically depicted in FIG. 6A, when the second frame element 24 engages stop 106, piston-cylinder units 44 and 46 are respectively fully extended and fully retracted. Likewise, as shown in FIG. 6B, when the second frame element engages stop 108, the piston-cylinder units 44 and 46 are respectively fully retracted and fully extended. This insures that the coacting structural and hydraulic components are safeguarded from damage.

In light of the foregoing, it will now be appreciated by those skilled in the art that the present invention provides a means of forcibly pivoting an implement in relation to a vehicle behind which it is being towed, and of holding the implement at any desired position. This assists the vehicle operator in steering the vehicle, while also insuring that the implement "tracks" properly behind the vehicle, even on hilly terrain with slippery surface conditions. These advantages are achieved without obstructing the rear vehicle deck, thereby enabling the vehicle to also carry other equipment, supplies or personnel.

Those skilled in the art will appreciate that the embodiment herein chosen for purposes of disclosure is susceptible to many modifications. For example, the stops 106, 108 can be relocated on the second frame element 24. Linear actuators such as for example screw jacks or the like can be substituted for the double-acting hydraulic piston-cylinder units 44, 46. Different hydraulic circuits can be employed. Thus it will be understood that the specific embodiment herein disclosed is to be considered as being descriptive rather than limiting in nature, and that modifications including those suggested above may be made without departing in scope from the broader aspects of the invention.

I claim:

1. A power hitch for pivotally manipulating an implement being towed behind a vehicle, said power hitch comprising:

a first frame element having means thereon for defining a vertical pivot axis, said first frame element being adapted for connection to the vehicle with said pivot axis located to the rear of the vehicle;

a second frame element adapted for connection to the implement, said second frame element having vertically spaced upper and lower plates interconnected in part by a rib lying on a central axis, with side plates cooperating with said rib and said upper and lower plates to define compartments, and with openings in said side plates communicating with said compartments;

means on the central axis of said second frame element for connecting said second frame element to said first frame element for pivotal movement about said pivot axis;

a pair of extensible actuators located in said compartments on opposite sides of said central axis, said actuators being arranged to extend through the openings in said side plates and being pivotally connected at opposite ends respectively to said first and second frame elements; and control means for extending either one of said actuators while simultaneously retracting the other of said actuators in order to pivot said second frame element and the implement connected thereto about said pivot axis.

2. The power hitch of claim 1 wherein the distance between the pivotal connections of said actuators to said second frame element is greater than the distance between the pivotal connections of said actuators to said first frame element.

3. The power hitch of either claims 1 or 2 wherein said actuators comprise double-acting hydraulic piston-cylinder units.

4. The power hitch of claim 1 further comprising stop members on one of said frame elements arranged to be contacted by the other of said frame elements to limit the extent to which said frame elements may pivot relative to each other about said pivot axis.

5. The power hitch of claim 1 wherein said actuators comprise double-acting hydraulic piston-cylinder units, and wherein said control means is operable to coordinate the operation of said units in a manner such that when one of said units is fully extended, the other of said units is fully retracted.

6. The power hitch of claim 5 wherein said frame elements are in contact with each other to limit further relative pivotal movement therebetween when either of said piston-cylinder units is fully extended with the other unit being fully retracted.

7. The power hitch of claim 2 wherein the pivotal connections of said actuators to said first frame element and said pivot axis lie in a common plane, with said central axis being perpendicular to said common plane when said actuators are identically adjusted to neutral positions.

8. The power hitch of claim 7 wherein the pivotal connections of said actuators to said second frame element lie in a second plane perpendicular to said central axis.

9. The power hitch of claim 1 wherein said actuators are disposed at an angle relative to said central axis.

* * * * *